(No Model.)

G. HARDING & T. HILL.
HOSE REEL.

No. 308,411. Patented Nov. 25, 1884.

Witnesses:
Geo. H. Strong.
J. H. Nourse

Inventors,
George Harding,
Thomas Hill
By Dewey & Co.
Attorneys

UNITED STATES PATENT OFFICE.

GEORGE HARDING, OF SAN RAFAEL, AND THOMAS HILL, OF SAN FRANCISCO, CALIFORNIA.

HOSE-REEL.

SPECIFICATION forming part of Letters Patent No. 308,411, dated November 25, 1884.

Application filed August 1, 1884. (No model.)

*To all whom it may concern:*

Be it known that we, GEORGE HARDING, of San Rafael, in the county of Marin, and THOMAS HILL, of the city and county of San Francisco, all in the State of California, have invented an Improvement in Hose-Reels; and we hereby declare the following to be a full, clear, and exact description thereof.

Our invention relates to certain improvements in hose-reels which are mounted upon carriages, so as to be portable.

It consists of an axle or shaft having a reel or drum secured to its central portion, so as to turn with it, bearing-wheels fitted upon the outer ends, upon which they turn loosely, fixed collars secured to the shaft just inside of the wheels, and a means for fixing the wheels rigidly to the shaft or collars, so as to cause the reel to rotate when the carriage moves over the ground.

It also consists in certain details of construction, all of which will be more fully explained by reference to the accompanying drawings, in which—

Figure 1:
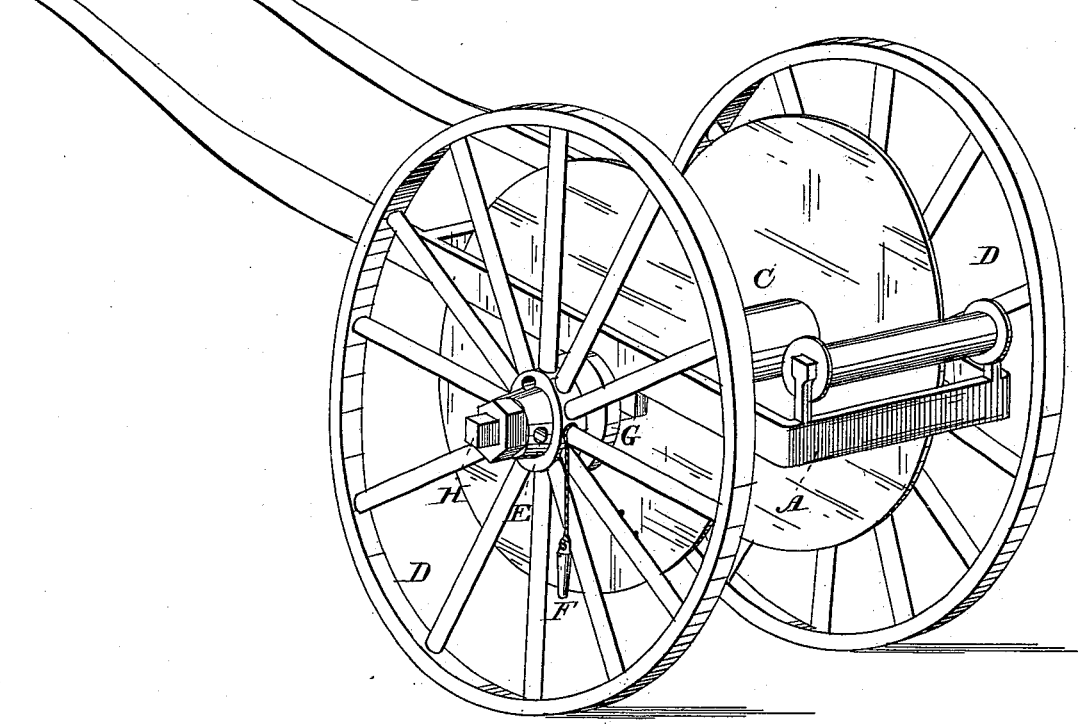
Figure 2:
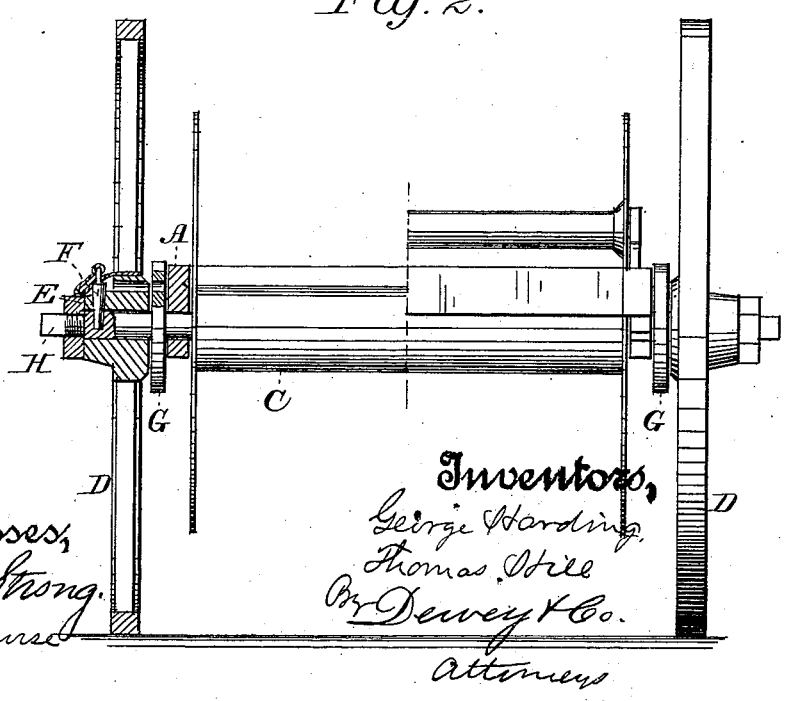

Figure 1 is a view of our apparatus. Fig. 2 is a rear view showing a vertical section through one wheel and hub.

A is a frame of any suitable form or style, which may have a tongue or pole and reels for the attachment of ropes when used as a hand-machine; or it may be provided with shafts for a horse. Upon or beneath this frame are boxes through which an axle passes and within which it turns. Upon the portion of the axle which is between the sides of the frame is fixed the hose reel or drum C, and the outer ends of the axle are fitted to receive the bearing-wheels D, which turn loosely upon the axle in the manner of an ordinary carriage-wheel. By this construction it will be seen that when the carriage is drawn over the ground these wheels turn upon the axles in the manner of ordinary carriage-wheels, while the hose-reel remains stationary and does not turn in either direction. Whenever it is desired to unreel the hose, it is only necessary to draw it off in the usual manner or to drop one end and drive the carriage away from it, when the axle will revolve backward as the carriage moves forward, and thus unreel the hose. When it is desired to take up the hose, we avail ourselves of the rotation of the bearing-wheels as the carriage is driven over the ground in the following manner: A hole, E, is made through the hub of the wheel, and a corresponding hole is made through the axle within the hub, so that a pin, F, may be inserted, passing through both holes and temporarily fixing one or both wheels to the axle, so that when the carriage is drawn over the ground the rotation of the wheels will cause the reel to be also rotated. In some cases this connection or union of the wheel to the axle may be effected by means of a collar, G, which is secured to the axle just inside of the wheel-hub, and a hole may then be made through the hub parallel with the axle, a similar hole being made in this fixed collar, a pin being introduced in this case horizontally instead of passing radially through the hub and axle. In some cases it may be desired to reel up the hose without moving the carriage from its position. For this purpose we make the outer ends of the axles square, as shown at H, so that a crank may be placed upon one or both, and the axle, with the reel which is fixed to it, turned so as to wind up the hose. In this case the pins will be withdrawn from the wheels, and will thus allow the axle to turn loosely within the wheel-hubs. By this construction we have a simple and efficient hose-reel, which is easily connected or disconnected with the traveling wheels, so as to unwind or wind up the hose at will.

Having thus described our invention, what we claim as new, and desire to secure by Letters Patent, is—

1. A shaft or axle with a hose reel or drum secured rigidly to it, and bearing or traveling wheels turning loosely upon its outer ends, in combination with pins fitted to perforations which are made through the wheel-hubs, and corresponding perforations in the axle or collars fixed thereto, substantially as herein described.

2. A hose-reel consisting of a frame having boxes through which a shaft or axle passes and turns, a reel or drum fixed to said shaft, and bearing or traveling wheels turning loosely upon the ends of the axle, and having perforations corresponding to similar perforations in the axle or collar fixed thereto, for the reception of the pins by which these wheels may be fixed to the axle, substantially as herein described.

In witness whereof we have hereunto set our hands.

GEORGE HARDING.
THOMAS HILL.

Witnesses:
H. B. APPLEWHAITE,
DANIEL CLARK.